(12) United States Patent
Lai et al.

(10) Patent No.: US 12,280,536 B2
(45) Date of Patent: Apr. 22, 2025

(54) SUPPORT STRUCTURES WITH FLUID CHANNELS

(71) Applicant: Alloy Enterprises Inc., Burlington, MA (US)

(72) Inventors: Alan Lai, Cambridge, MA (US); Alison Forsyth, Somerville, MA (US); Paul Titchener, Somerville, MA (US); Lyle Cheatham, Marblehead, MA (US)

(73) Assignee: Alloy Enterprises Inc., Burlington, MA (US)

( * ) Notice: Subject to any disclaimer, the term of this patent is extended or adjusted under 35 U.S.C. 154(b) by 0 days.

(21) Appl. No.: 18/696,958

(22) PCT Filed: Oct. 3, 2022

(86) PCT No.: PCT/US2022/045577
§ 371 (c)(1),
(2) Date: Mar. 28, 2024

(87) PCT Pub. No.: WO2023/059569
PCT Pub. Date: Apr. 13, 2023

(65) Prior Publication Data
US 2024/0336006 A1    Oct. 10, 2024

Related U.S. Application Data

(60) Provisional application No. 63/252,092, filed on Oct. 4, 2021.

(51) Int. Cl.
*B29C 64/147* (2017.01)
*B29L 23/00* (2006.01)
(Continued)

(52) U.S. Cl.
CPC ....... *B29C 64/147* (2017.08); *B29L 2023/001* (2013.01); *B33Y 10/00* (2014.12); *B33Y 80/00* (2014.12)

(58) Field of Classification Search
CPC ..................................................... B29C 64/147
(Continued)

(56) References Cited

U.S. PATENT DOCUMENTS

| 5,730,817 A | 3/1998 | Feygin et al. |
| 11,015,872 B2 | 5/2021 | Aston et al. |

(Continued)

FOREIGN PATENT DOCUMENTS

| DE | 19710783 A1 | 9/1998 |
| DE | 19925510 A1 | 12/2000 |

(Continued)

OTHER PUBLICATIONS

Suzuki K., et al.,"English machine-translation by Clarivate Analytics of JP2016151387A, Aug. 22, 2016. Full JP patent application is included. (Year: 2016)" (Year: 2016).*

(Continued)

*Primary Examiner* — S. Behrooz Ghorishi
*Assistant Examiner* — Gregory C. Grosso
(74) *Attorney, Agent, or Firm* — Danielson Legal LLC

(57) ABSTRACT

Methods and systems for manufacturing a workpiece. The method described herein includes depositing at least a first sheet on a substrate, the first sheet comprising a first part region and a first support structure region separated at least in part by a first void space; and operably positioning a plate with respect to the first sheet so that the first void space forms a channel suitable for carrying a fluid.

5 Claims, 10 Drawing Sheets

(51) Int. Cl.
*B33Y 10/00* (2015.01)
*B33Y 80/00* (2015.01)

(58) Field of Classification Search
USPC .......................................................... 156/60
See application file for complete search history.

(56) References Cited

U.S. PATENT DOCUMENTS

| | | |
|---|---|---|
| 2008/0240987 A1 | 10/2008 | Yamada et al. |
| 2012/0009099 A1* | 1/2012 | Lin ................... B01L 3/502707 |
| | | 422/503 |
| 2013/0228950 A1* | 9/2013 | DeSimone ........ B01L 3/502707 |
| | | 264/226 |
| 2016/0184789 A1 | 6/2016 | Takagi et al. |
| 2016/0325278 A1 | 11/2016 | Takagi et al. |
| 2018/0320125 A1* | 11/2018 | Levner .............. B01L 3/502761 |

FOREIGN PATENT DOCUMENTS

| | | |
|---|---|---|
| DE | 10356308 A1 | 6/2005 |
| JP | 2016151387 A | 8/2016 |

OTHER PUBLICATIONS

International Search Report for PCT/US2022/045577, Jan. 24, 2023, 2 pages.
Written Opinion for PCT/US2022/045577, Jan. 24, 2023, 6 pages.
Office action for Israeli Pat. Appl. No. 311646, May 26, 2024, 4 pages.
Office action for German Pat. Appl. No. 11 2022 003 772.5, Aug. 7, 2024, 10 pages.

\* cited by examiner

SUPPORT STRUCTURES WITH FLUID CHANNELS

CROSS REFERENCE TO RELATED APPLICATIONS

The present application claims the benefit of and priority to International (PCT) Patent Application No. PCT/US2022/045577, filed internationally on Oct. 3, 2022, which claims the benefit of and priority to U.S. provisional application No. 63/252,092, filed on Oct. 4, 2021, the entire disclosure of each of which is hereby incorporated by reference as if set forth in their entirety herein.

TECHNICAL FIELD

Embodiments described herein relate to methods and systems for manufacturing an object and, more particularly but not exclusively, to methods and systems for manufacturing an object comprising a plurality of layers.

BACKGROUND

Laminated object manufacturing (LOM) or other types of additive manufacturing techniques generally involve stacking and bonding multiple sheets together to yield a solid object. However, surface oxides on these layers may inhibit bonding of the layers, and therefore pose a challenge for additive manufacturing and laminated object manufacturing techniques.

Existing techniques for mitigating the effects of surface oxides may involve using traditional vacuums or purged gas chambers. However, these techniques are expensive and are not tailored to the geometry of the part or structure being manufactured. Accordingly, these techniques have low throughput per chamber.

A need therefore exists for improved systems and methods for manufacturing parts.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for manufacturing an object. The method includes depositing at least a first sheet on a substrate, the first sheet comprising a first part region and a first support structure region separated at least in part by a first void space; and operably positioning a plate with respect to the first sheet so that the first void space forms a channel suitable for carrying a fluid.

In some embodiments, the method further includes depositing a second sheet, the second sheet comprising a second part region and a second support structure region separated at least in part by a second void space; and applying external pressure to the first sheet and the second sheet to create an external barrier, the external barrier having a first port fluidically connected to a first end of the channel.

In some embodiments, the method further includes forming a first port fluidically connected to a first end of the first void space to form a channel, wherein the first port enables a gas, liquid, or vacuum force to be introduced into the channel. In some embodiments, the method further includes forming a second port fluidically connected to a second end of the first void space.

In some embodiments, a first bridge connects the first part region and the first support structure region of the first sheet. In some embodiments, the method further includes depositing a second sheet on the first sheet, wherein a second bridge connects a second part region of the second sheet and a second support structure region of the second sheet, wherein the first bridge and the second bridge are offset from each other.

In some embodiments, the first sheet includes a plurality of first part regions and a plurality of first support structure regions that are fluidly connected by the first void space. In some embodiments, the first void space connects the plurality of first part regions and the plurality of first support structure regions in parallel. In some embodiments, the first void space connects the plurality of first part regions and the plurality of first support structure regions in series.

In some embodiments, the method further includes forming at least one secondary channel in the first support structure region, wherein the at least one secondary channel does not contact the first part region and is in operable connectivity with a first port that enables a gas, liquid, or vacuum force to be introduced into the secondary channel.

In some embodiments, the method further includes introducing a heating fluid or a cooling fluid into the channel.

According to another aspect, embodiments relate to an enclosure. The enclosure includes a first sheet including a first part region, a first support structure region, and a first void space separating, at least in part, the first part region and the first support structure region; and a plate operably positioned with respect to the first sheet so that the first void space forms a channel suitable for carrying a fluid.

In some embodiments, the enclosure further includes a second sheet including a second part region and a second support structure region separated at least in part by a second void space, wherein the first sheet and second sheet create an external barrier with a first port fluidically connected to a first end of the channel.

In some embodiments, the enclosure further includes a first port fluidically connected to a first end of the first void space to form a channel, wherein the first port enables a gas, fluid, or vacuum force to be introduced into the channel. In some embodiments, the enclosure further includes a second port fluidically connected to a second end of the first void space.

In some embodiments, the enclosure further includes a first bridge connecting the first part region and the first support structure region of the first sheet. In some embodiments, the enclosure further includes a second sheet deposited on the first sheet, wherein the second sheet includes second bridge connecting a second part region of the second sheet and a second support structure region of the second sheet, wherein the first bridge and the second bridge are offset from each other.

In some embodiments, the first sheet includes a plurality of first part regions and a plurality of first support structure regions that are fluidly connected by the first void space.

In some embodiments, the enclosure further includes at least one secondary channel in the first support structure region, wherein the at least one secondary channel does not contact the first part region and is in operable connectivity with a first port that enables a gas, fluid, or vacuum force to be introduced into the secondary channel.

According to another aspect, embodiments relate to a method for manufacturing an object. The method includes depositing at least a first sheet on a substrate, the first sheet comprising a first part region and a first support structure region separated at least in part by a first void space; and forming at least one second void space throughout a portion of the first support structure region, wherein the at least one second void space does not contact the first part region and is in operable connectivity with a port to enable a gas, fluid, or vacuum force to be introduced into the second void space.

In some embodiments, the method further includes flushing a refrigerant through the at least one second void space.

In some embodiments, the method further includes depositing a second sheet, the second sheet comprising a second part region, a second support structure region separated at least in part by a third void space, and a fourth void space throughout a portion of the second sheet, wherein the fourth void space does not contact the second part region; and applying external pressure to the first sheet and the second sheet to create an external barrier, the external barrier having a first port fluidically connected to a first end of the channel.

In some embodiments, the method further includes injecting a fluid in the second void space during a quenching process.

In some embodiments, the method further includes injecting a fluid through the second void space during a pre-heating process.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
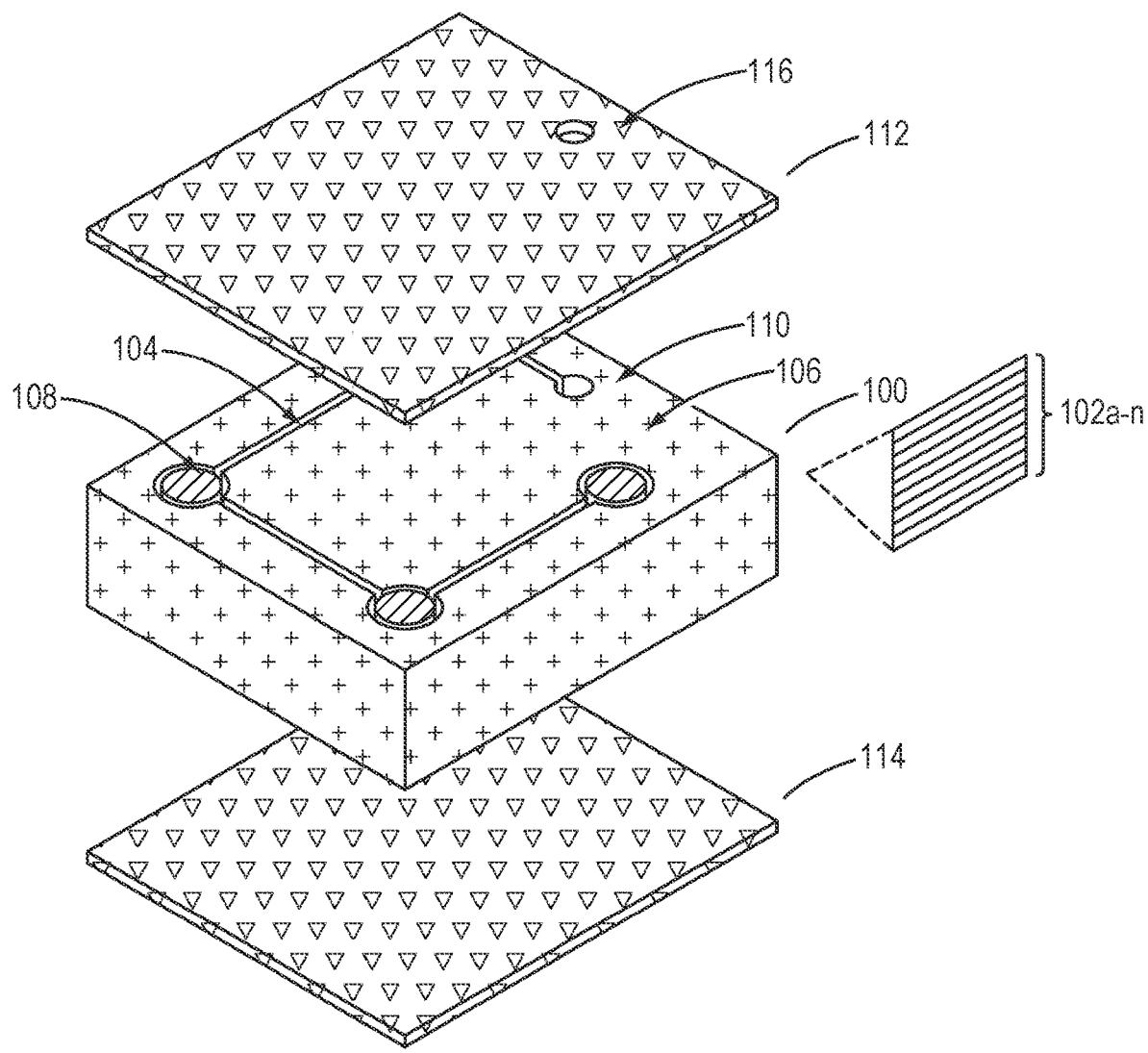
FIG. 1 illustrates a perspective view of a workpiece in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The term "foil" or "sheet" (for simplicity, "sheet") may refer to a metallic sheet used to form a layer in a workpiece. The sheet may comprise one or more sub-layers, of which there is at least one layer, and optionally some number of interlayers comprising a different metal alloy from the first layer. In some embodiments, a sheet has a thickness in one dimension between 10 µm and 10 mm. In some embodiments, a sheet has a thickness in one dimension between 25 µm and 1000 µm. In further embodiments, a sheet may have a thickness in one dimension between 50 µm and 500 µm. In some embodiments, the sheet may be patterned corresponding to the design of the object(s) and its support structure(s). In some embodiments, the sheet may comprise at least one of Al, Sb, Ba, Be, Bi, B, Cd, Ca, C, Cr, Co, Cu, Gd, Ga, H, Fe, Pb, Li, Mg, Mn, Mo, Nd, Ni, Nb, N, O, Pd, P, K, S, Si, Ag, Na, Sr, S, Ta, Th, Sn, Ti, V, Y, Zn, Zr, or a rare earth metal. In some embodiments, the sheet may comprise at least one of aluminum, magnesium, titanium, aluminum alloy, magnesium alloy, or titanium alloy.

A "layer stack" or "workpiece" may refer to at least two sheets. A single sheet may include at least one support region and at least one part region. A support region may refer to a non-object component of the sheet that, when bonded together, forms a holder or jig that conforms to object and the exterior of the workpiece, and may be used in subsequent post-processing. This holder or jig, formed as a combination of multiple support structures, may be referred to as a "support structure." The combination of part regions may be referred to as a "part region." The process of combining may be referred to as "joining." Each sheet may be cut according to a pattern to separate a part region and a support structure region.

The embodiments described herein may introduce gases, fluids, vacuum forces, or some combination thereof (for simplicity, "fluid") to a workpiece to at least enhance the bonding of layers. The fluids may be introduced to modify a workpiece that contains one or more unbonded parts, or introduced to remove fluids from a workpiece.

To accommodate the introduction of fluids, the layers may include void spaces that separate regions of the layers. Specifically, a "void space" as used herein may refer to a space between a part region and a support structure region resulting from cutting a sheet. Additionally or alternatively, a "void space" may refer to a space between two support structure regions in a sheet. When layers with these void spaces are stacked together, the void spaces across the layers form channels that allow a fluid to flow therein.

In some embodiments, the created channel may be flushed with a liquid flux. This may wet the internal channel surfaces to preferentially remove surface oxides, absorb oxygen or other oxidizing species present, and then purge the same.

When the workpiece is prepared for bonding, the structure may be brought up to temperature and the bonding process started. The methods described above to flow gas, a fluid, or draw a vacuum on the enclosure may be employed throughout the bonding process.

For aluminum layers, the embodiments herein may use bonding methods such as diffusion bonding, transient liquid phase diffusion bonding, and/or brazing. Specific configurations of materials, such as alloy composition, alloy structure including composites of two or more sub-layers with distinct compositions, and process conditions, such as applied temperature and pressure, may yield strong metallic bonds with shorter and more robust processes useful for manufacturing aluminum parts.

FIG. 1 illustrates a perspective view of a workpiece 100 in accordance with one embodiment. As seen in FIG. 1, the workpiece 100 may comprise a plurality (e.g., hundreds or thousands) of individual sheets 102a-n such as those discussed above, where n is the number of total layers in the workpiece 100.

Each sheet 102a-n may be cut to form a void space 104 throughout a portion of the layer. Each sheet 102 a-n may also include a support structure region 106 and one or more part regions 108. As seen in FIG. 1, the support structure region 106 and the part regions 108 are separated from each other by void space 104 that has been cut into the sheet 102a. Although only the top sheet 102a of the workpiece 100 is shown in FIG. 1, other sheets 102b-n of the workpiece 100 may have similar configurations including void space(s) 104, support structure region(s) 106, and part regions 108.

Figure 2:
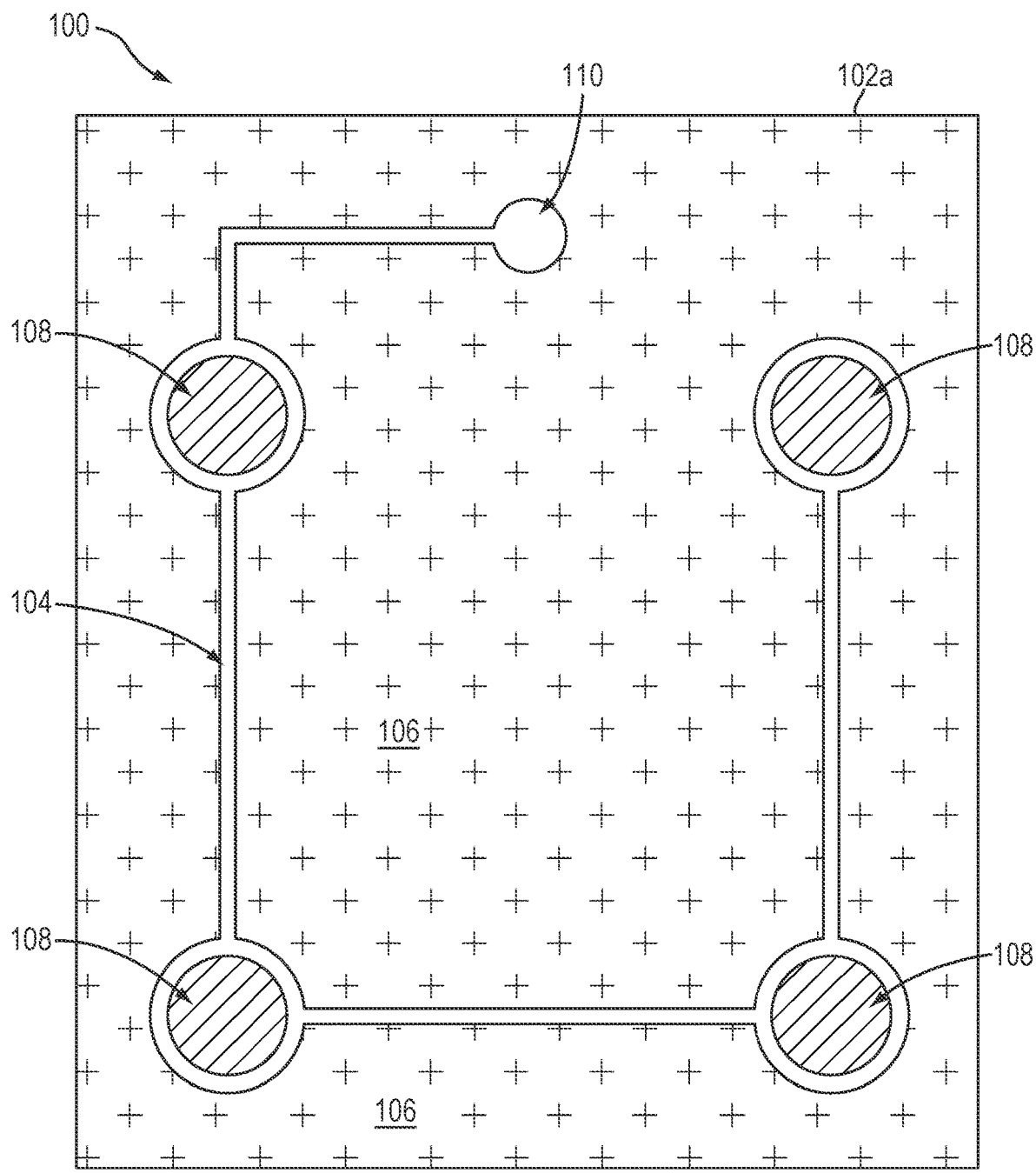
FIG. 2 illustrates a top view of the workpiece of FIG. 1.

FIG. 2 illustrates a top view of the workpiece 100 of FIG. 1 in accordance with one embodiment. More specifically, FIG. 2 illustrates a top view of the top sheet 102a of the workpiece 100. As seen in FIG. 2, the top sheet 102a may include four part regions 108 that are each separated from the support structure region 106 by void space 104.

The workpiece 100 of FIGS. 1 and 2 may also include a first port 110. The first port 110 may allow a vacuum force to be introduced into the first void space 104 or channels formed from the multiple void spaces of each sheet 102a-n. The introduced vacuum force may help remove debris from the layers to improve bonding, for example.

The internal channels formed by the void spaces 104 may contact bonding surfaces or may be cut through the support structure region 106 of the sheets 102a-n, thereby fluidically connecting void spaces 104 that surround separate part regions 108. The void spaces 104 may be formed via any appropriate cutting technique such as drag knife cutting, laser cutting, etching, or the like. Other types of cutting, whether available now or invented hereafter, may be used to form the void space(s) 104 in accordance with the embodiments herein.

Referring back to FIG. 1, to form an enclosure there may be a plate 112 operably positioned with respect to the top sheet 102a of the workpiece 100, and a substrate 114 operably positioned with respect to the bottom sheet 102n of the workpiece 100. The placement of the plate 112 and the substrate 114 with respect to the workpiece 100 creates the enclosed channel formed from the void space 104 of each sheet 102a-n. That is, as the void spaces 104 of each sheet 102a-n are enclosed the result is a channel that allows a fluid to go through the workpiece 100. In the arrangement of FIGS. 1 and 2, the void spaces 104 around the part regions 108 are connected in series (i.e., the void space 104 is formed as one fluidic line).

The exact configuration or type of plate 112, substrate 114, or the combination thereof may vary. In some embodiments, at least one of these components may be anodized or otherwise inhibited from bonding to the support structure region 106 and the part region(s) 108. In some embodiments, the anodized or otherwise inhibited metal plate that is not a support structure region or a part region may be positioned with respect to the workpiece 100 to form an enclosure, which creates the channel(s) from the void spaces of the sheets. The enclosure is formed when the stack of sheets is compressed, which removes gaps between the layers and forms a gas barrier. The channels typically have at least one of an inlet port(s) and outlet port(s) open on an exterior surface of the enclosure. In some embodiments, the plate 112, the substrate 114, or both, may refer to a platen used during the manufacturing process. Accordingly, the sheets may be stacked directly in a bonding machine.

In some embodiments, one or more of the plate 112, substrate 114, or other similar component may include one or more physical components such as hooks that allow the workpiece to be grasped. This may help maneuver the various components of the workpiece such as during a manufacturing process. This configuration may be helpful in situations in which the substrate 114 is larger than the footprint of the workpiece, for example.

Also during manufacturing, the workpiece may be protected by an enclosure or otherwise by a shielded volume. This may provide protection from external elements and temperature insulation, for example. In some embodiments, an inert gas may be routed or pumped through the workpiece enclosure. The inert gas may flow through the workpiece or through the enclosed volume. The gas may be introduced at a desired temperature. The gas outlet may be fluidically connected to the ambient atmosphere via a pump or exhaust system, or vented to at least one of the shielded and remainder volumes. In some embodiments, the shielded volume may be placed under positive pressure with an inert gas, which supports the internal channels in the workpiece.

The plate 112 may also include an aperture 116 that aligns with the port 110 of the workpiece 100. The aperture 116 may be a hole that seals with a gasket (not illustrated) to, for example, a vacuum or a gas pumping system. The port 110 and aperture 116 may each have dimensions between 500 µm and several centimeters, for example, and may have the same or different dimensions. In some embodiments, there may be at least one small inlet to introduce an inert gas such as argon or nitrogen to the workpiece, which can be optionally closed during operation. At least one outlet may have larger dimensions to allow vacuum to be effectively drawn through the workpiece.

The above-described gasket may refer to any type of device such as a metal device that can engage with the port or hole of the workpiece and connect to some other device or system. For example, the gasket may include a tapered nozzle that connects to a gas source or other type of machine. The gasket may be a metal gasket included with or otherwise connected with a metal tube to some external system, device, reservoir, fluid supply, or the like.

The workpiece 100 of FIGS. 1 and 2 only includes one port 110. While this allows a vacuum force to be introduced into the channel, it does not allow for a gas or liquid to be pumped through the workpiece 100. In order for a fluid pumping system to pump a fluid through a channel, there may need to be at least one other port at a distal end of the channel.

Figure 3:
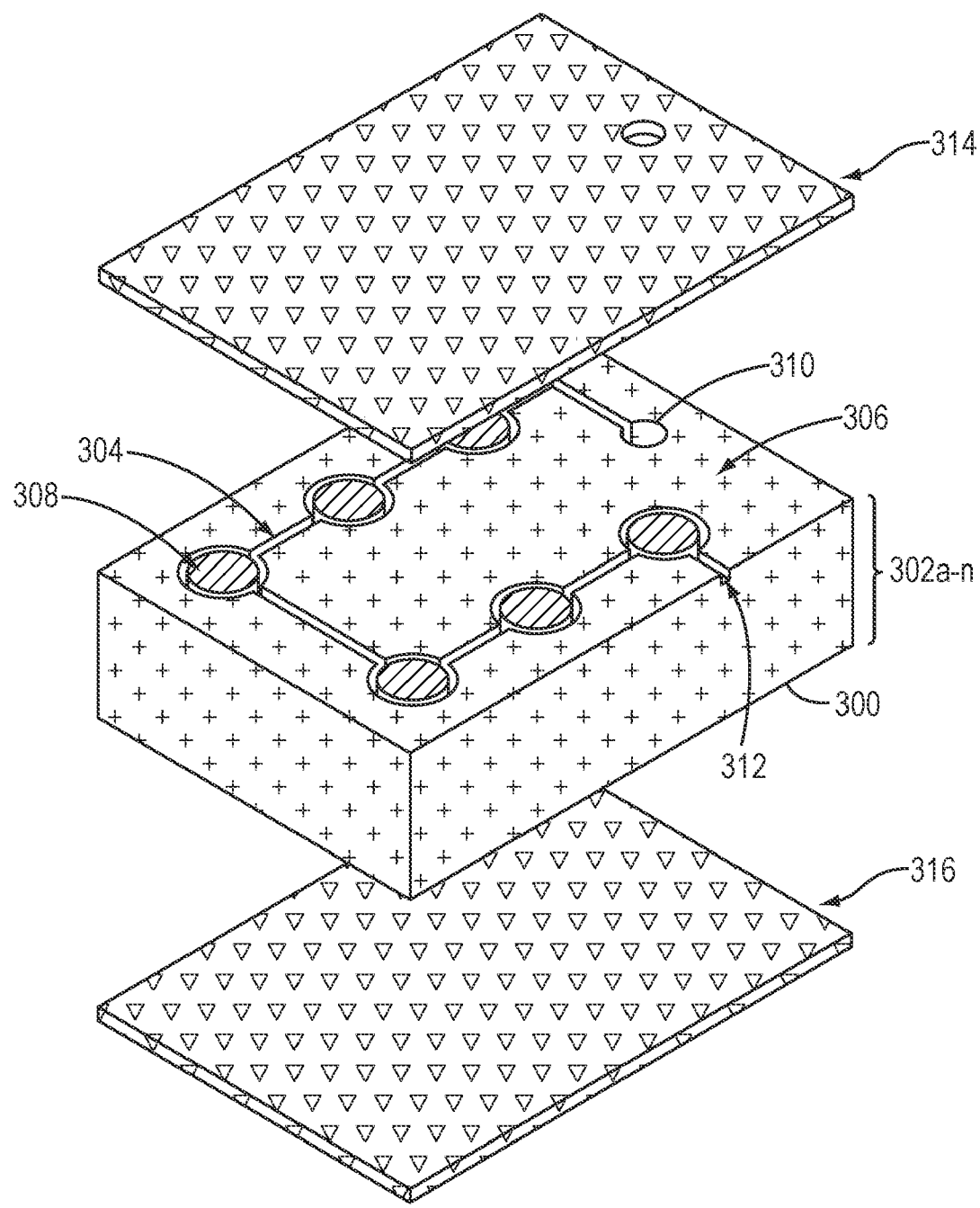
FIG. 3 illustrates a perspective view of a workpiece in accordance with another embodiment.
Figure 4:
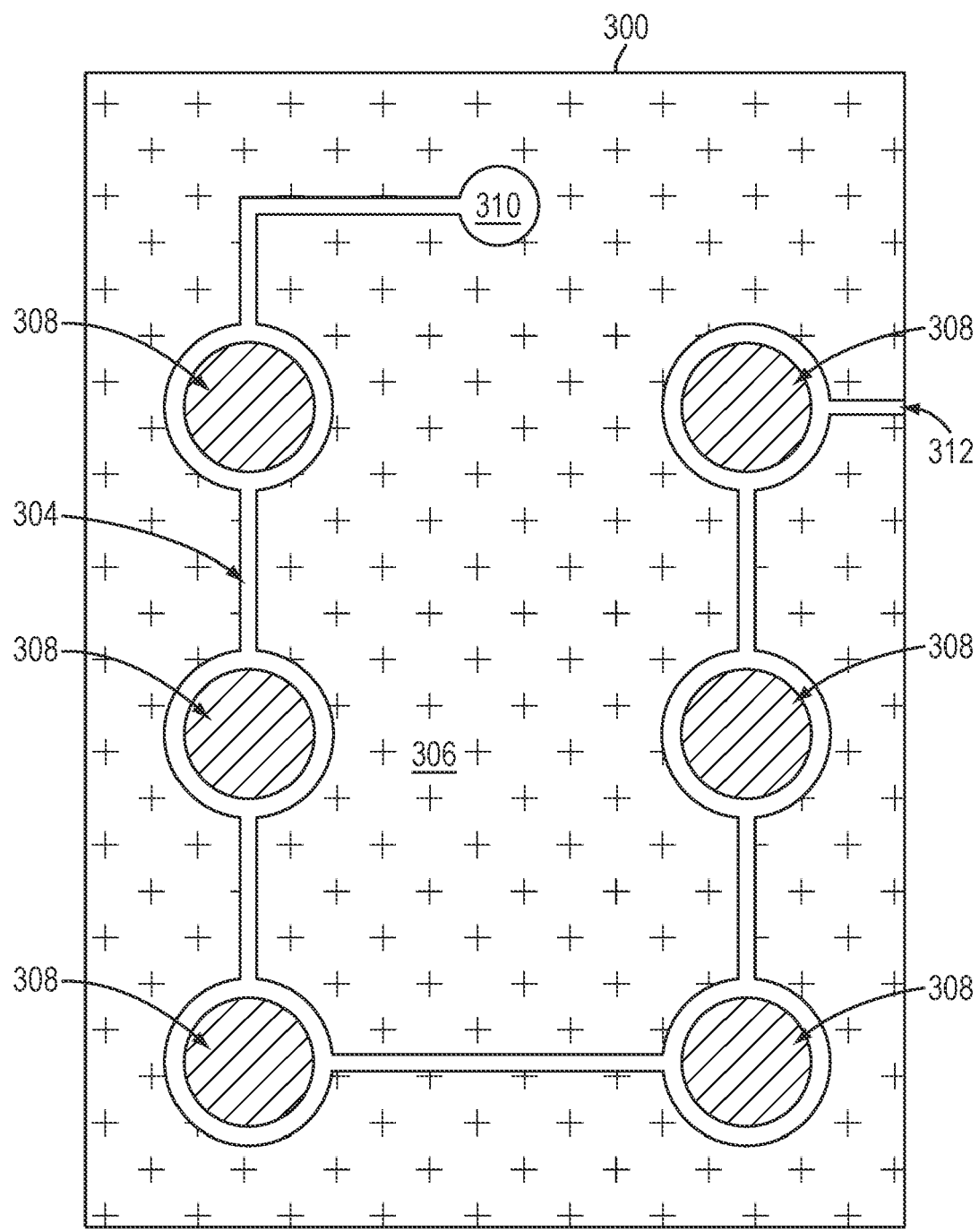
FIG. 4 illustrates a top view of the workpiece of FIG. 3.

FIG. 3 illustrates a workpiece 300 in accordance with another embodiment. The workpiece 300 may be similar to the workpiece 100 of FIG. 1, and may include a plurality of sheets 302a-n, a first void space 304, a support structure region 306, and a plurality of (e.g., six) part regions 308. As seen in FIG. 3, the first void space 304 may separate the support structure region 306 and each of the plurality of part regions 308. FIG. 4 illustrates a top view of the top layer 302a of the workpiece 300.

To accommodate the traversal of a fluid through the void space 304, the workpiece 300 may include a first port 310 at one end of the void space 304 and a second port 312 or outlet at another end of the void space 304. In other words, the first void space 304 creates a path between the first port 310 and the second port 312 through the workpiece 300.

This allows for the introduction of fluid into the first port 310 and enables the fluid to travel through a channel formed from the void space 304 of each layer 302a-n and out of the second port 312. In other words, fluid exits the workpiece 300 from the second port 312. The second port 312 may be a cut from the channel to at least one of the outside surfaces of the workpiece 300. For embodiments in which a vacuum is used, there may only need to be one port in the workpiece to accommodate a vacuum force, as in FIGS. 1 and 2.

The workpiece 300 of FIGS. 3 and 4 may receive a reducing or inert gas. For example, the workpiece 300 may be flushed with a reducing gas such as, but not limited to, ammonia; carbon monoxide; halogens including chlorine, hydrofluoric acid, hydrogen, hydrogen sulfide, magnesium, and saline; or some combination thereof. This may reduce the surface oxides and leave a cleaner surface to facilitate bonding.

In some embodiments, the workpiece 300 may be flushed with an inert gas to remove atmospheric oxygen and other oxidizing species that may be present on layers or otherwise in the workpiece 300. Inert gases used in accordance with the embodiments herein may include nitrogen, argon, or any other non-oxidizing gas. The oxidizing species may include water or other oxygen-containing species that were generated by exposure to a reducing gas in a prior processing step.

As in FIG. 1, the workpiece 300 may be enclosed by a plate 314 and a substrate 316 to create a channel defined by the void space 304 of each layer 302a-n. In embodiments in which fluid such as gas or liquid is flushed through the enclosure channels, the size or shape of outlet port(s) 312 may be adjusted so that the hydraulic resistance to flow is greatest at the outlet port(s) 312.

In some embodiments, the channel(s) may be designed to match flow resistance through parallel paths in a workpiece. In some embodiments, the channel width and that of the outlet port 312 may be selected to reduce back diffusion of gases into the workpiece 300. The size, shape, or configuration of the channel may also vary depending on the application or type of object being manufactured.

The inlet port 310 may have dimensions between 500 μm and several centimeters. The outlet port 312 may have a similar size and geometry. The outlet port 312 may be cut in the plane of a single sheet 302a-n, or may be cut so that the outlet channels are fluidically connected through multiple sheets.

The inlet port 310 and the outlet port 312 may the same, similar, or different dimensions. In some embodiments, the inlet port may be smaller than the outlet port. For example, the inlet port 310 may be small enough to allow a gas to be injected into the workpiece. The outlet port 312, on the other hand, would be larger to accommodate a vacuum force. In these embodiments, the inlet port 310 may be plugged or otherwise closed to accommodate the introduction of the vacuum force via the outlet port 312.

In some embodiments, all exterior surfaces of the formed enclosure are formed from the support structure regions 306 of the workpiece 300. In other words, the part regions 308 may be fully enclosed within the support structure regions.

Figure 5:
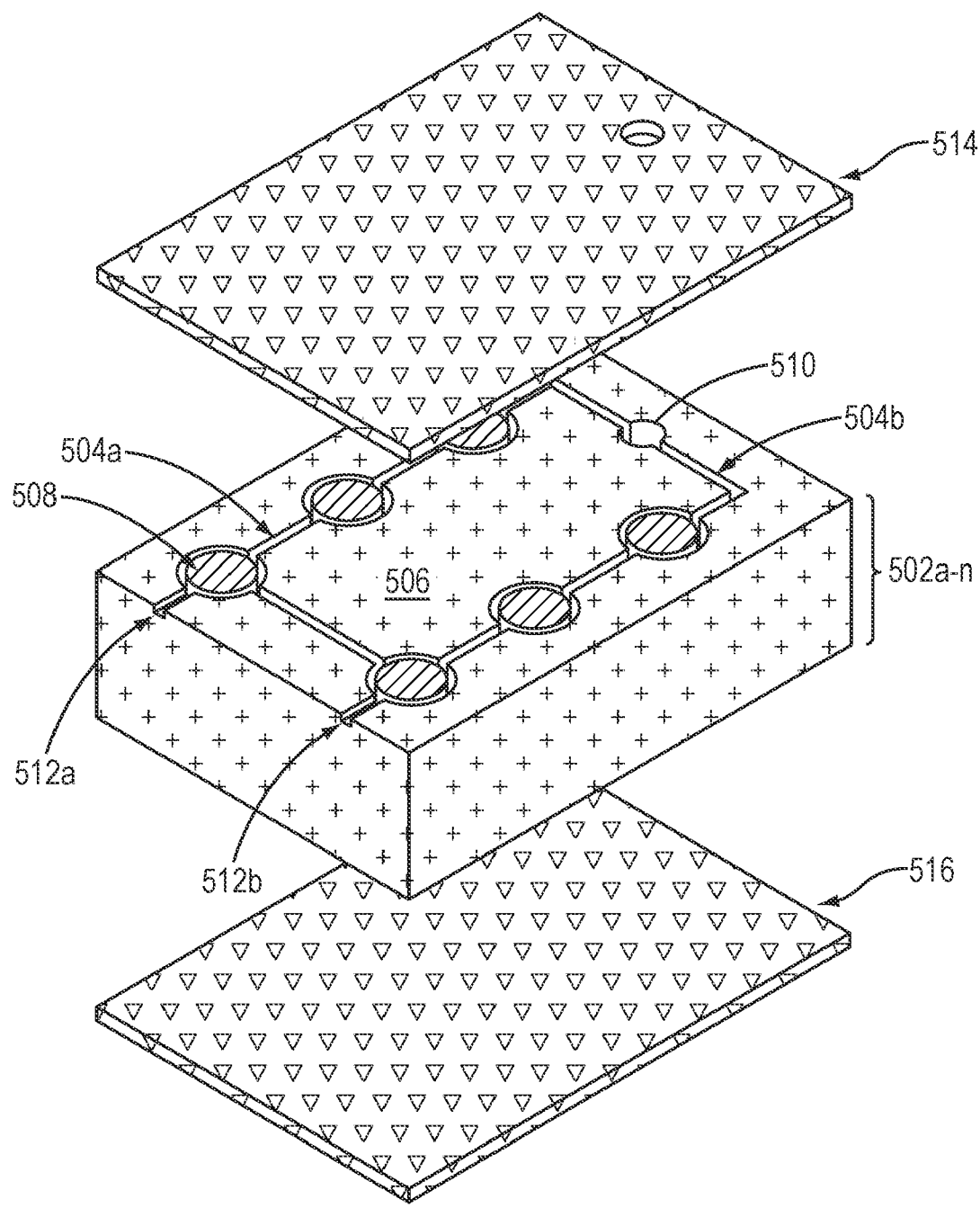
FIG. 5 illustrates a perspective view of a workpiece in accordance with another embodiment.
Figure 6:
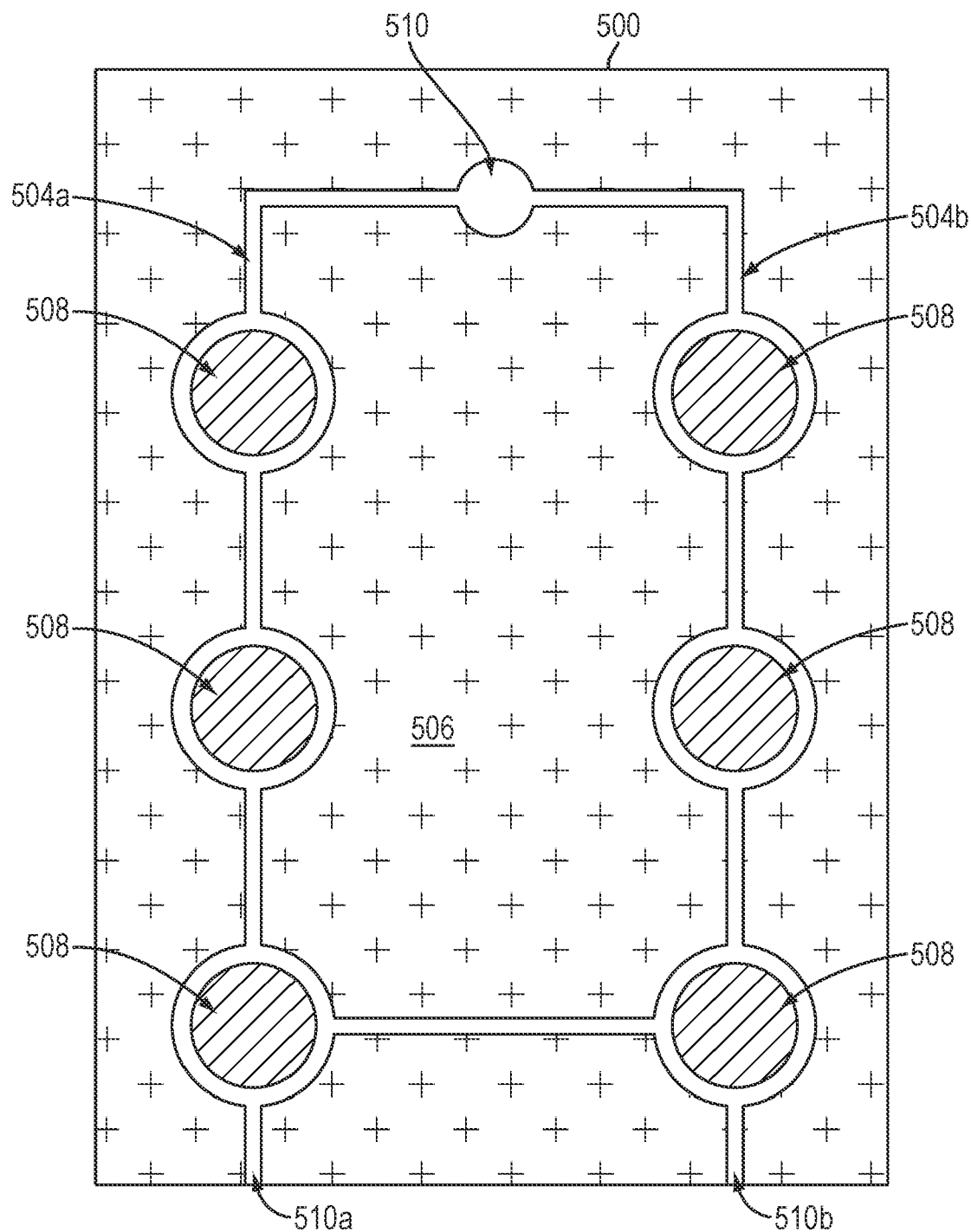
FIG. 6 illustrates a top view of the workpiece of FIG. 5.

FIG. 5 illustrates a perspective view of a workpiece 500 in accordance with another embodiment. FIG. 6 illustrates a top view of the top sheet 502a of the workpiece 500. As in previous embodiments, the workpiece 500 may include a plurality of sheets 502a-n.

The workpiece 500 may include a void space that defines a path 504a and a path 504b, a support structure region 506, and a plurality of (e.g., six) part regions 508. As seen in FIGS. 5 and 6, the void space defining path 504a connects to part regions 508 on one side of the workpiece 500 and the void space defining path 504b connects to part regions 508 on the other side of the workpiece 500. The embodiment shown in FIG. 5 may also include a port 510, outlet ports 512a and 512b, a plate 514, and a substrate 516.

The port 510 may be positioned at a first end of the void space that defines paths 504a and 504b. The first port 510 may enable a fluid to be introduced into the void space that defines paths 504a and 504b.

The workpiece 500 may also include an outlet channel or port 512a at a second end of the path 504a, and may include an outlet channel or port 512b at a second end of the path 504b. Accordingly, the paths 504a and 504b are laid out in parallel, with the portions of the void space around each part region 508 connected to multiple fluidic lines with equal resistance to flow.

Fluid such as gas may be introduced into the first port 510, and may be removed from or otherwise exit the workpiece 500 at the outlet ports 512a and 512b. As discussed in conjunction with FIGS. 3 and 4, the outlet channels 512a and 512b may be cut from an internal channel to at least one of the outside surfaces of the workpiece 500.

Although not shown in FIGS. 1-6, the sheets 102a-n, 302a-n, and 504a-n may include one or more bridges that connect the support structure regions and the part region(s). These bridges may be placed on alternating sheets so that the void spaces on either side of the bridge remain fluidically connected.

The bridges may be created during the cutting process. Specifically, the cutting process may involve forming the aforementioned void spaces, while leaving a portion of the layer between a support structure region and a part region. This remaining portion(s) bridge the part region and the support structure region.

Figure 7A:
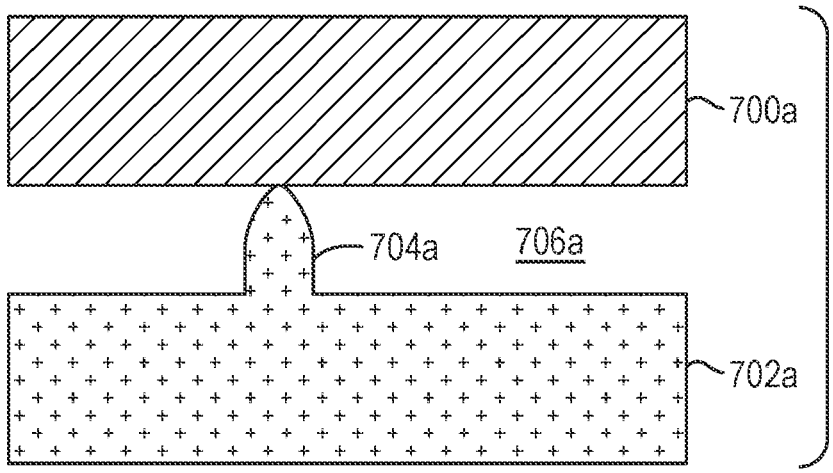
FIGS. 7A-D illustrate various layers with bridge portions in accordance with various embodiments.

For example, FIG. 7A illustrates a top view of a first layer in accordance with one embodiment. The first layer may include a support structure region 700a, a part region 702a, and a bridge 704a. The bridge 704a may be a portion of the layer that remains after cutting the layer to form the void space 706a.

Figure 7B:
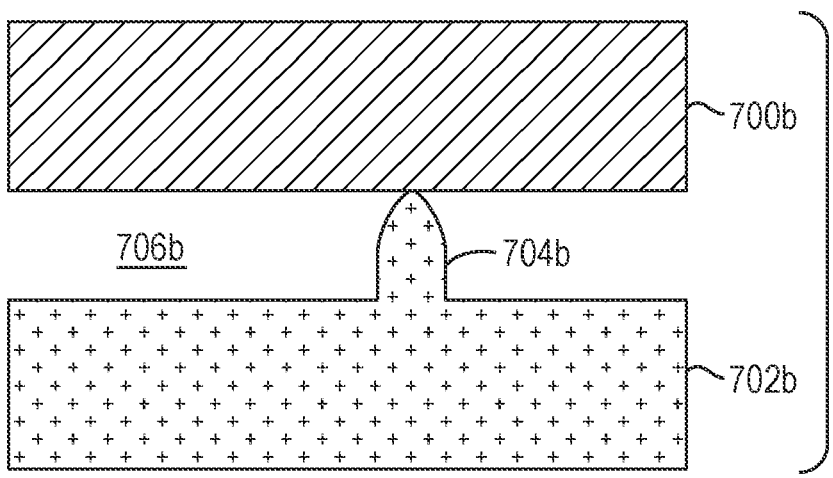

FIG. 7B illustrates a top view of a second layer in accordance with one embodiment. The second layer may include a support structure region 700b, a part region 702b, and a bridge 704b. As seen in FIG. 7B, the bridge 704b is slightly offset or otherwise positioned at a different location in the layer than the bridge 704a of FIG. 7A. The bridge 704b may be a portion of the layer that remains after cutting the layer to form the void space 706b.

Figure 7C:
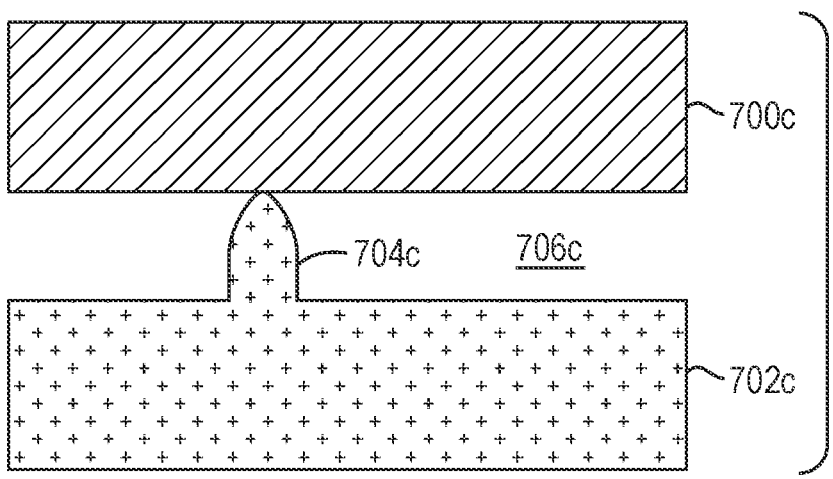

FIG. 7C illustrates a top view of a third layer in accordance with one embodiment. The third layer may include a support structure region 700c, a part region 702c, and a bridge 704c. As seen in FIG. 7C, the bridge 704c is positioned at least substantially the same location on the layer as bridge 704a of FIG. 7A, but offset from the bridge 704b of FIG. 7B. The bridge 704c may be a portion of the layer that remains after cutting the layer to form the void space 706c.

Figure 7D:
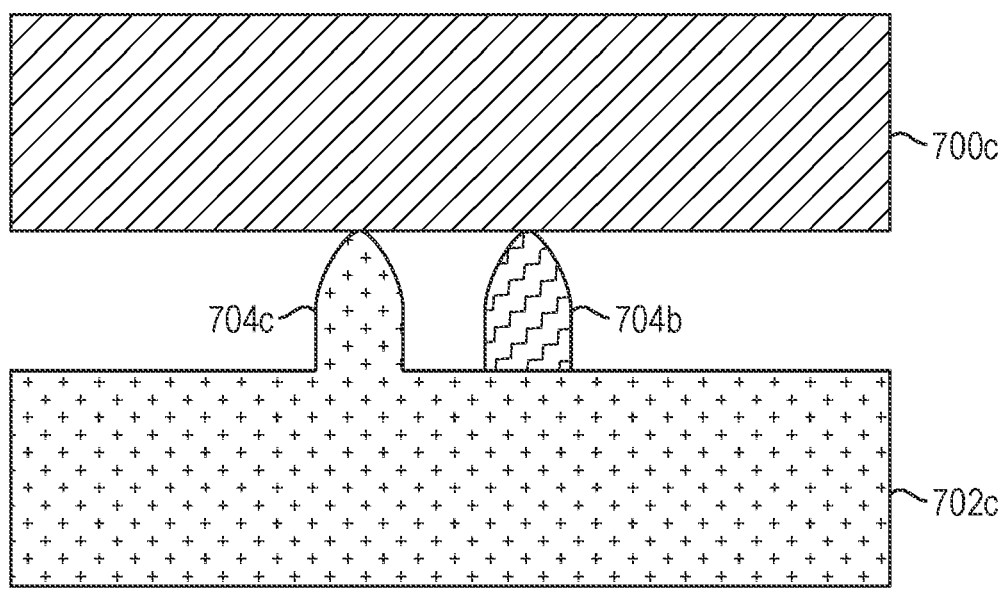

FIG. 7D illustrates a top view of the layers of FIGS. 7A-C stacked onto each other. The support structure regions 700a-c of FIGS. 7A-C connect to form the support structure region of the workpiece. The part regions 702a-c connect to form the part region of the workpiece. The void spaces of each layer line up with each other to form the void space of the structure.

More specifically, FIG. 7D illustrates the layer of FIG. 7C which, in this embodiment, is the top layer of the workpiece. Also seen in FIG. 7D is the bridge 704b of the second layer of FIG. 7B, as the bridge 704b is offset from the bridge 704c of FIG. 7C. The bridge 704a of FIG. 7A is not able to be seen, as it is "behind" the bridge 704c. In other words, the bridges 704a and 704c are positioned on their respective layers such that when the layers are stacked the bridges 704a and 704c are aligned. The positioning of the bridges interconnects the support structure regions and the part regions without blocking the channel that will be formed when those layers are enclosed.

Figure 8:
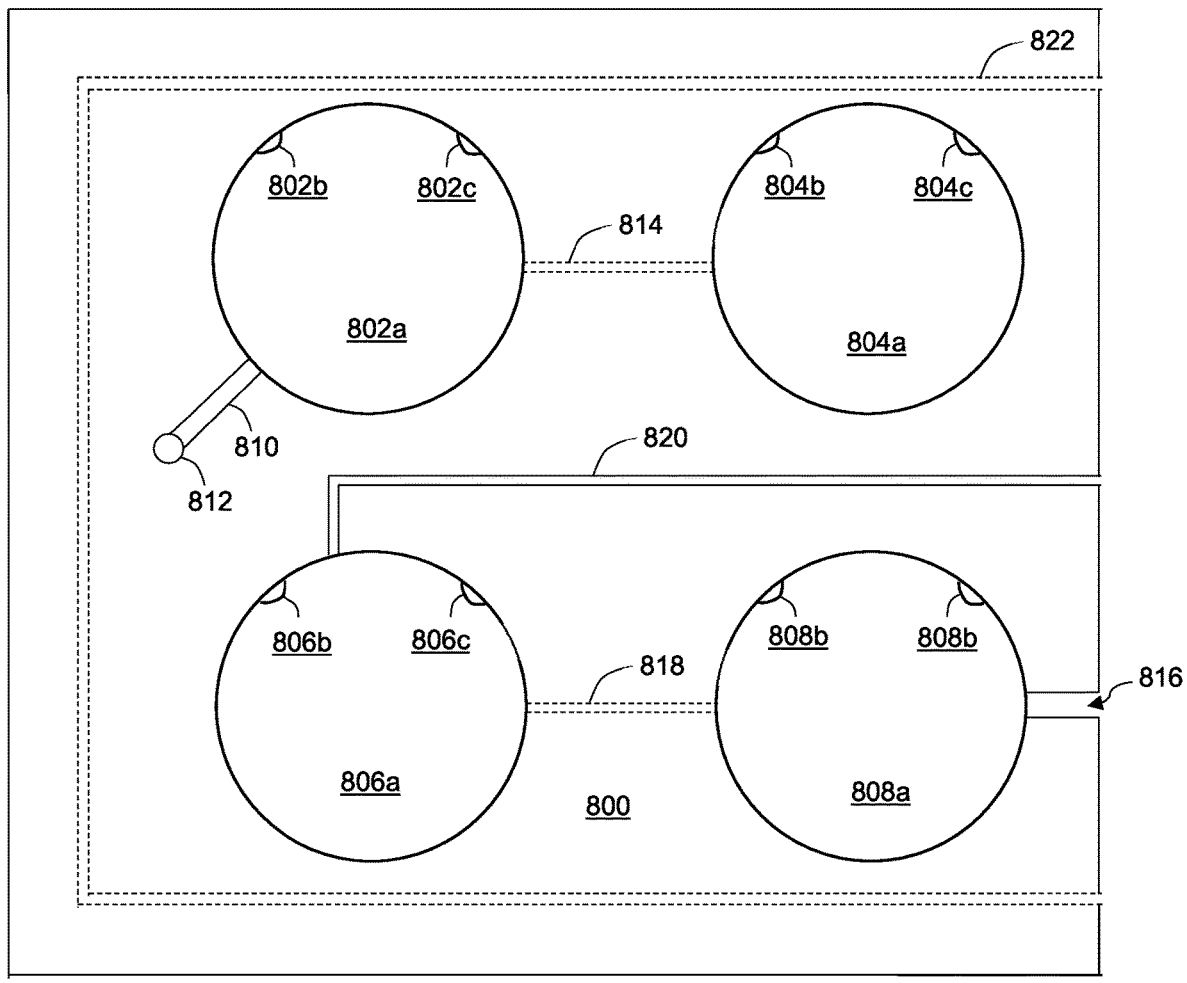
FIG. 8 illustrates a top view of a support structure in accordance with one embodiment.

The number of and layout of part regions, as well as the overall shape and configuration of a workpiece may vary. For example, FIG. 8 illustrates top view of a support structure 800 in accordance with one embodiment. The support structure 800 is illustrated with four part regions removed, leaving spaces 802a, 804a, 806a, and 808a. Each of these spaces may be configured or otherwise associated with one or more bridge portions. For example, space 802a is associated with bridges 802b and 802c; space 804a, bridges 804b and 804c; space 806a, bridges 806b and 806c; and space 808a, bridges 808b and 808c. The bridges of each portion may be offset from each other. That is, the bridge portions that form bridge 802b may be offset from the bridge portions that form bridge 802c.

The support structure 800 is also configured with or otherwise includes multiple channels or flow paths. First, there is a path 810 that connects a port 812 with space 802a. Space 802a is further connected to space 804a via channel 814. Accordingly, this configuration allows a vacuum force to be introduced through port 812, and the channels 810 and 814 allow the vacuum force to be introduced into space 802a and 804a.

Second, a port 816 connects the exterior of the structure 800 to space 808a, and a channel 818 connects space 808a and 806a. Space 806a is also connected to the exterior of the structure 800 via channel 820. Accordingly, this configuration allows a fluid to be introduced into and through the spaces 806a and 808a. For example, this configuration may be used in a purging operation, such as with argon gas.

The structure 800 may also include a channel 822 that extends around the perimeter of the spaces 802a-08a and the associated parts. Accordingly, the structure(s) in accordance with the embodiments herein may include channels that extend throughout the structure but do not contact part region(s). These types of channels may enable a fluid to be introduced therein to force oxygen or other oxidizers through the structure. In some embodiments, this type of channel 822 reduces the need to build a vacuum channel.

In some embodiments, inert gas may be pumped through one or more channels 822 in the workpiece. In this embodiment, the internal volume of the bonding machine may be held at a rough vacuum level or under an inert gas at lower pressure than the channel(s) 822. The inert gas may be vented to the workpiece enclosure volume, where a rough vacuum pump removes the gas from the system.

In some embodiments, a vacuum force may be drawn on the internal channel(s) 822 in the workpiece. In this embodiment, the workpiece may be filled with an inert gas at a desired pressure and temperature. The inert gas may be vented through the channel(s) 822 to the workpiece enclosure volume, where a rough vacuum pump removes the gas from the system.

In some embodiments, the workpiece may be pre-heated via the introduction of a hot gas through the channel(s) of the workpiece. In a multi-step heating profile, the workpiece may be flushed with hot inert gas during a preheating process step, and then a vacuum force may be drawn on the workpiece during the bonding process step.

The void spaces and formed channels may be used for a variety of purposes. For example, the present application largely discusses the channels being used for enhancing bonding. However, in some applications the channels may be used during a quenching process, such as for larger parts that are more difficult to manufacture. These channel(s) may be used to introduce a refrigerant into the structure, for example.

Figure 9:
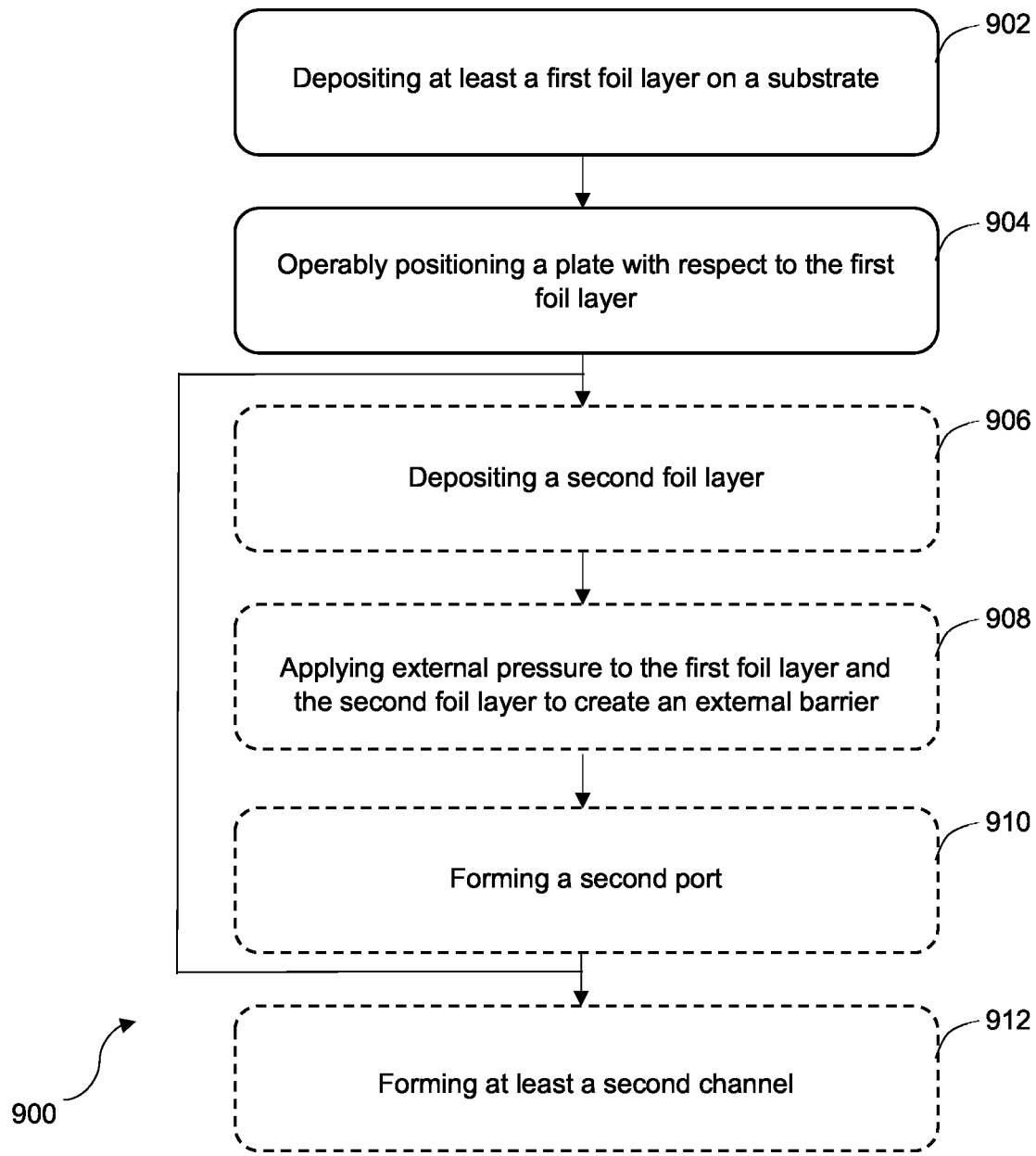
FIG. 9 depicts a flowchart of a method for manufacturing an object in accordance with one embodiment.

FIG. 9 depicts a flowchart of a method 900 for manufacturing an object in accordance with one embodiment. The object may be similar to any of the structures of FIGS. 1-8, for example.

Step 902 involves depositing at least a first sheet on a substrate. As discussed previously, the sheet may comprise at least one of Al, Sb, Ba, Be, Bi, B, Cd, Ca, C, Cr, Co, Cu, Gd, Ga, H, Fe, Pb, Li, Mg, Mn, Mo, Nd, Ni, Nb, N, O, Pd, P, K, S, Si, Ag, Na, Sr, S, Ta, Th, Sn, Ti, V, Y, Zn, Zr, or a rare earth metal. In some embodiments, the sheet may comprise at least one of aluminum, magnesium, titanium, aluminum alloy, magnesium alloy, or titanium alloy.

The first sheet may include a first part region and a first support structure region separated at least in part by a first void space. The substrate may be similar to the substrate 114 of FIG. 1, for example.

Step 904 involves operably positioning a plate with respect to the first sheet so that the first void space forms a channel suitable for carrying a fluid. The plate may be similar to the plate 112 of FIG. 1, for example. Accordingly, the placement of the plate and the substrate form an external barrier including at least the first sheet, such that the void space forms a channel suitable for carrying a fluid such as a gas, liquid, or a vacuum force.

Step 906 involves depositing a second sheet. As discussed previously, a workpiece may include at least hundreds or thousands of individual layers. Similar to the first layer, the second sheet may include a second part region and a second support structure region separated at least in part by a second void space.

Step 908 involves applying external pressure to the first sheet and the second sheet to create an external barrier, the external barrier having a first port fluidically connected to a first end of the channel. The first port may enable a gas, liquid, or vacuum force (for simplicity, "fluid") to be introduced into the channel.

Step 910 involves forming a second port fluidically connected to a second end of the first void space. The first and second ports may be connected to each other by the channel and allow a fluid to be flushed into, through, and out of the workpiece. As discussed previously, the void space that extends from the first and second ports may be in series or in parallel.

Step 912 involves forming at least one secondary channel in the first support structure region. The at least one secondary channel does not contact the first part region and is in operable connectivity with a port that enables a gas, liquid, or vacuum force (for simplicity, "fluid") to be introduced into the secondary channel.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods and systems. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. A method for laminated manufacturing of an object, the method comprising:
   depositing at least a first metallic sheet on a substrate, the first metallic sheet comprising a first part region and a first support structure region that is a non-object component of the first metallic sheet, the first part region and the first support structure region separated at least in part by a first void space formed by cutting the first metallic sheet; and
   operably positioning a plate with respect to the first metallic sheet so that the first void space forms a channel suitable for carrying a fluid,
   wherein a first bridge remaining after cutting the first metallic sheet connects the first part region and the first support structure region of the first metallic sheet, and
   wherein the first support stricture region conforms to the first part region and an exterior of the first metallic sheet.

2. The method of claim 1, further comprising depositing a second metallic sheet on the first metallic sheet, wherein a second bridge connects a second part region of the second metallic sheet and a second support structure region of the second metallic sheet, wherein the first bridge and the second bridge are offset from each other.

3. A method for laminated manufacturing of an object, the method comprising:
   depositing at least a first metallic sheet on a substrate, the first metallic sheet comprising a first part region and a first support structure region that is a non-object component of the sheet, the first part region and the first support structure region separated at least in part by a first void space formed by cutting the first metallic sheet; and
   operably positioning a plate with respect to the first metallic sheet so that the first void space forms a channel suitable for carrying a fluid,
   wherein the first metallic sheet includes a plurality of first part regions and a plurality of first support structure regions that are fluidly connected by the first void space, and
   wherein the plurality of first support structure regions conform to the plurality of first part regions and an exterior of the first metallic sheet.

4. The method of claim 3, wherein the first void space connects the plurality of first part regions and the plurality of first support structure regions in parallel.

5. The method of claim 3, wherein the first void space connects the plurality of first part regions and the plurality of first support structure regions in series.

* * * * *